(12) United States Patent
Breuer et al.

(10) Patent No.: US 12,213,201 B2
(45) Date of Patent: Jan. 28, 2025

(54) METHOD AND USER EQUIPMENT FOR SELECTING A CORE NETWORK

(71) Applicant: Telit Cinterion Deutschland GmbH, Munich (DE)

(72) Inventors: Volker Breuer, Botzow (DE); Lars Wehmeier, Falkensee (DE)

(73) Assignee: Telit Cinterion Deutschland GmbH, Munich (DE)

( * ) Notice: Subject to any disclaimer, the term of this patent is extended or adjusted under 35 U.S.C. 154(b) by 341 days.

(21) Appl. No.: 17/633,630

(22) PCT Filed: Aug. 12, 2020

(86) PCT No.: PCT/EP2020/072611
§ 371 (c)(1),
(2) Date: Feb. 8, 2022

(87) PCT Pub. No.: WO2021/032565
PCT Pub. Date: Feb. 25, 2021

(65) Prior Publication Data
US 2022/0369407 A1 Nov. 17, 2022

(30) Foreign Application Priority Data
Aug. 16, 2019 (EP) .................................... 19192050

(51) Int. Cl.
*H04W 76/19* (2018.01)
*H04W 36/00* (2009.01)

(52) U.S. Cl.
CPC ....... *H04W 76/19* (2018.02); *H04W 36/0066* (2013.01)

(58) Field of Classification Search
CPC .......................... H04W 76/19; H04W 36/0066
See application file for complete search history.

(56) References Cited

U.S. PATENT DOCUMENTS 9,713,182 B2 * 7/2017 Baek ..................... H04W 8/005
10,469,376 B2 * 11/2019 Dowlatkhah ........... H04L 12/66
(Continued)

FOREIGN PATENT DOCUMENTS

CN 102388654 A 3/2012
CN 108347751 A 7/2018
(Continued)

OTHER PUBLICATIONS

International Search Report (PCT/ISA/210) and Written Opinion (PCT/ISA/237) mailed on Nov. 5, 2020, by the European Patent Office as the International Searching Authority for International Application No. PCT/EP2020/072611 (WO2020/032565)—[14 pages].
(Continued)

*Primary Examiner* — Harry H Kim
(74) *Attorney, Agent, or Firm* — PEARL COHEN ZEDEK LATZER BARATZ LLP (57) ABSTRACT

Provided herein is a system, components, and methods for a user equipment therein operating on a first base node of a cellular network, the first base node communicatively coupled to two core networks of said cellular network, the user equipment operating in an open data exchange session by means of a data exchange context terminating in selected one of the two core networks, the user equipment further maintaining a first device identity received from said selected core network. Other embodiments are disclosed.

5 Claims, 3 Drawing Sheets

(56) References Cited

U.S. PATENT DOCUMENTS

| | | | |
|---|---|---|---|
| 11,330,662 B2* | 5/2022 | Chen | H04W 48/08 |
| 2013/0208699 A1 | 8/2013 | Hakkinen et al. | |
| 2019/0297550 A1* | 9/2019 | Zhang | H04W 48/16 |
| 2020/0112940 A1* | 4/2020 | Fan | H04W 76/27 |
| 2020/0314941 A1* | 10/2020 | Bai | H04B 7/022 |
| 2020/0323018 A1* | 10/2020 | Chen | H04W 76/30 |
| 2020/0404562 A1* | 12/2020 | Sharma | H04W 76/10 |

FOREIGN PATENT DOCUMENTS

| | | |
|---|---|---|
| EP | 3537766 A1 | 9/2019 |
| WO | WO2018082591 A1 | 5/2018 |
| WO | WO2018226024 A1 | 12/2018 |
| WO | WO2019053185 | 3/2019 |
| WO | WO2019078964 | 4/2019 |

OTHER PUBLICATIONS

"3rd Generation Partnership Project; Technical Specification Group Radio Access Network; UTRAN functions, examples on signalling procedures (Release 15)", 3GPP Standard; Technical Report; 3GPP TR 25.931, 3rd Generation Partnership Project (3GPP), Mobile Competence Centre; 650, Route Des Lucioles ; F-06921 Sophia-Antipolis Cedex; France, vol. RAN WG3, No. VI5.0.1, May 17, 2019 (May 17, 2019).

3GPP Vodafone, Ericsson, S2-186928, "Introduction of local RRM policy specific UE differentiation", Jun. 26, 2018.

3GPP Ericsson, R3-185124, "Data forwarding for Retrieve UE Context in case of RRC connection re-establishment", Aug. 28, 2018.

3GPP Ericsson, R3-185125, "Data forwarding for Retrieve UE Context in case of RRC connection re-establishment", Aug. 28, 2018.

3GPP, Nokia, Nokia shanghai Bell, S2-1907827, "Optimised sending of PEI in 5GS", Jun. 27, 2019.

3GPP, Huawei, "R2-1903421 Connectivity to 5G CN for NB-IoT", Mar. 29, 2019.

3GPP, Nokia,"R2-1705247 RRC connection establishment, re-establishment, and resume", May 6, 2017.

3GPP, TR 23.724, 3rd Generation Partnership Project; Technical Specification Group Services and System Aspects; Study on Cellular IoT support and evolution for the 5G System (Release 16), V1.01.0, Oct. 2018.

* cited by examiner

METHOD AND USER EQUIPMENT FOR SELECTING A CORE NETWORK

CROSS-REFERENCE TO RELATED APPLICATIONS

This application is a National Phase Application of PCT International Application No. PCT/EP2020/072611, International Filing Date Aug. 12, 2020, claiming priority to European Application No. 19192050.3, filed Aug. 16, 2019, which is hereby incorporated by reference.

FIELD OF THE INVENTION

The present invention relates to a method for selecting a core network of a cellular network comprising at least two core networks. The invention also pertains to a user equipment using said method.

Further the invention relates to a base node of the cellular network. The invention also pertains to a method for said base node.

BACKGROUND OF THE INVENTION

In the advent of new technology standards, in particular New Radio (5G) it is discussed to start a co-existence and close inter-working of LTE (4G) network architecture with the 5G core architecture. According to that the introduction of 5G is decided to be in the so-called Non-Stand-Alone (NSA) mode, that means 5G gNodeBs (gNB) will provide the new air interface for 5G compliant user equipments (UE), but the core network behind is using the available 4G infrastructure. However, the full deployment of 5G is supposed to comprise an introduction of 5G infrastructure as well.

Consequently for the user equipment there is the possibility that the gNodeB resp. eNodeB (in the following: the base node) it is camping on has the possibility to connect to the 4G core (Evolved Packet Core EPC) or the 5G core (NextGenCore NGC).

Generally it is the cellular network, in particular the base node who decides alone or in combination with other cellular network components about which core network is selected. However for the case of NB-IoT—which forms a category of LTE for user equipment supporting limited bandwidth and processing power, and supposed to be available as 5G category as well—it is the user equipment that makes the decision about which core network to select/request. This is due to the fact that the user equipments requests directly terminate in the core network, hence a selection is necessary once more than one core network is available.

Especially as the different core networks can accommodate for specific services, i.e. in the 5G core the so called slices for service provisioning will be available, related information will be broadcasted by the eNB and hence a UE being interested could select to said 5G core-network accordingly. A UE not being interested in such service could select towards the 4G core to make most benefit of the power-saving features specified in the context of EPC connection, whilst a legacy device does not really have a choice and is connected to EPC core anyway. Besides the UE selection, also the network can send a UE being capable to support both core networks to the one or other for load sharing purposes. Hence such UE may decide also to change the core network towards their preferred core when establishing a connection with a new base node.

In ETSI 3GPP Technical Report TR23.724 V.1.10 it is proposed that the respective base node sends in the broadcasted system information indications concerning the availability of multiple core networks, and the user equipment is supposed to perform the core network selection as part of a RRC connection establishment request.

However, what is not solved in that context is the situation of a user equipment which has setup a connection resp. a data exchange context with the serving base node, and before finally terminating the connection leaves the coverage area or wants to resume and re-use said data exchange context of the serving base node. In NB-IoT the mobility is handled by the user equipment, instead of the base node carrying out a handover, the UE detects a Radio Link Failure (RLF), and sets up at the next neighbor base node a RRC-Connection-Reestablishment with the cause "Radio Link Failure", preferably including its used identification, like RNTI or TMSI and the identity of the previously used serving base node. Then the new base node can fetch the context from the indicated previously serving base node and continue the operation.

However, the situation might occur that the neighbor base node is not capable of supporting the same core network than the previous base node. That would lead to a connection loss and required setting up a new connection, as the context cannot be fetched, simply due to the fact that no access to the previous used core network is available.

It is therefore the goal of present invention to overcome the mentioned shortcomings and to propose a solution for solving the mobility issue for such user equipments.

As this is an advantageous concept for migrating to new technology standards, it is to expected that future generations will be introduced the same, so the mentioned problem is not limited to the 4G/5G co-existence case.

Further alternative and advantageous solutions would, accordingly, be desirable in the art.

SUMMARY OF THE INVENTION

In a first aspect, the invention is embodied as a method to operate a user equipment. In a second aspect, the invention is embodied as a user equipment. In a third aspect, the invention is embodied as a first core network element. In a fourth aspect, the invention is embodied as a second core network element. In a fifth aspect, the invention is embodied as a method for operating a second core network element. In a sixth aspect, the invention is embodied as a base node.

According to the first aspect of the invention it is proposed a method for a user equipment operating on a first base node of a cellular network, the first base node communicatively coupled to two core networks of said cellular network, the user equipment operating in an open data exchange session by means of a data exchange context terminating in selected one of the two core networks, the user equipment further maintaining a first device identity received from said selected core network, the method comprising the step for the user equipment of:

identifying at least one second base node of said cellular network, checking if said at least one second base node has access to the selected core network, if not, sending a connection reestablishment message to the second base node, having access to a core network different from the selected core network, hereinafter the second core network, receiving through the second base node a second device identity of the second core network, sending an acknowledge message to the second base node, resuming said data exchange session with said second base node over the second core network using said second device identity.

This aspect relates to a user equipment operating in a cellular network. The user equipment is in particular equipped with communication circuitry and processing circuitry for communicating with a base node of the cellular network. The user equipment and the base node, as well as the cellular network, is in particular supporting one of the cellular wireless communication technology standard of GSM (2G), UMTS (3G), LTE (4G), NR (5G) or beyond. The cellular network supports at least two of the technology standards. This is done by means of having at least two core networks of different technology standard. In the example of a LTE and a NR network this would in particular be the Evolved Packet Core (EPC) defined in 4G and the NextGenCore (NGC) defined in 5G. Other combinations are of course encompassed by the invention. Further it is encompassed that the cellular network comprises more than two core networks, e.g. a 2G and a 3G cellular network in addition.

With regards to the base node the user equipment is camping on, this is in the addresses scenario coupled to at least two core networks. This is in particular an eNodeB (which is a 4G base node) or a gNodeB (a 5G base node).

The proposed scenario is in particular applicable for the case of a base node supporting the sub-category NarrowBand-IoT (NB-IoT), which is an embedded category for user equipments with lower processing power, in particular those designed for the Internet of Things (IoT), and allows only to address and decode a subset of a frequency range with a different modulation scheme than the rest of the frequency range of the base node.

NB-IoT is the LPWA (Low-Power Wide Area) solution for both technologies and hence supported by LTE and NR. It is envisaged that a UE that is able to operate in NB-IoT can operate in NB-IoT on eNodeBs or gNodeBs. Which is especially true for future devices as legacy devices will not understand signaling and information related to NGC and possibilities/features provided there. Hence the UE will always choose the EPC. However, for future user equipments it is considered that the support for connectivity to both core networks and according availability of user equipments needs will result in a requested connection to the one or other core.

The method starts with the situation of the user equipment camping on said base node, and being operating in an ongoing or suspended (intended to be resumed) data exchange session characterized by means of a data exchange context. That in particular means, that the user equipment is in an open connection or has established such a connection which is momentary suspended but intended to be resumed with another user equipment or a remote server, e.g. via over the internet, and supposed to exchange data. The related control information and necessary side conditions/parameters are part of the data exchange context. The data exchange context has an identifier, the so-called context identity and can accordingly be resumed by said context identity when staying connected to same core network.

Such data exchange context resp. data exchange session terminates in one of the core networks. Terminating means, that the communication path is routed through a core network element of the respective core network. Each core network comprises one or more core network elements, supporting the technology standard of the core network. The data exchange session is in particular created there with known methods. Alternatively the data exchange session was started on a different base node with a different core network element. In any case the user equipment received a first device identity from the selected core network, which identifies the device and facilitates identifying the respective data exchange context at the core network element.

The method is in particular applicable for the situation that the user equipment leaves the coverage area of the first base node where it is camping on. This coverage area is also called the cell. Latest in that situation the user equipment would then try to identify at least one second base node, which has better signalling conditions or at least acceptable connection conditions, as the coverage area which could provide a suitable service of the first base node was left.

According to an advantageous embodiment it is proposed that the step of identifying at least one second base node is conducted in response to detecting a radio link failure in communication with the first base node.

Preferably for NB-IoT the mobility management is carried out in the user equipment. That means in particular that if the amount of radio link failures during the data exchange session is above a predetermined threshold, then the user equipment will try to identify a second base node in order to safely continue the data exchange session. This is done that way that the UE operating in NB-IoT selects the second base node according the best radio conditions belonging to said PLMN without evaluating connected core networks.

Known methods are applied to identify a second base node, and to decide to change from the first to the second base node. This procedure is called RRC connection re-establishment upon detection of a radio link failure (RLF), i.e. loss of connection in the previous cell.

For the case of NB-IoT the RRC Connection re-establishment with cause "radio link failure" is even applicable in case of an open data exchange session, that means it is driven by the user equipment itself.

For other categories of user equipments, in particular supporting LTE Cat M, Cat 1 etc., mobility between cells would preferably be ensured by a handover. In that case of a handover, driven by the base node, the UE measures and reports neighbor cells in advance and the base node decides the connection being transferred "handed over" and maintained by another suitable cell. However the required measurements in connected mode in parallel to maintain a connection and performing related signaling in the situation of decreasing communication link quality exceeds the capability of NB-IoT devices and hence mobility is done via RLF.

In any case, when the second base node is identified it needs to be assured that the data exchange session can be resumed, that means continuing the data exchange without the need to establish a new connection. This would require, that the base node can access the selected core network.

However, it maybe that the second base node is a legacy 4G eNodeB with only access to the 4G core. Should the current data exchange context be operated by a selected core network of the NextGenCore, then the base node could not continue the data exchange context for this data exchange session. So this situation needs to be checked.

For doing so the user equipment is checking if the second base node has access to the selected core network.

Related information can be retrieved from the broadcast of the selected base node. As outlined before the connected core has no influence on the selection process, as the base node with best radio capability is selected. Any search for a base node being connected to a specific core network may not lead to success and will take long time and consumes energy, hence the next available base node is selected regardless of the connected core.

When the check reveals that the base node supports access to the selected core network then the connection reestablishment message with the first device identity and the context identity will be successful (RRC Connection reestablishment with cause "RLF"). That means the data exchange session over the existing data exchange context characterized by said context identity can be resumed afterwards. The context and device identity just has a meaning for said one first core network and is not known in second core network.

However, when the base node does not support access to the selected core network, then a different solution is needed. Here is where the invention comes into play.

This method branch starts with sending a connection reestablishment message to the base node. The difference to the existing procedure is that this RRC connection reestablishment message has preferably not the simple cause/ purpose "re-establishment due to RLF" it is rather an RRC connection re-establishment message with cause/purpose "core-context fetch". This message in particular comprises the first device identity and at least one context identity. The connection reestablishment message is in particular supposed to be forwarded to the second core network element of the other core network, where the base node is communicatively coupled with.

The at least one context identity refers to the potential of a user equipment to hold more than one data exchange context. Additionally one or more context identity which is no valid (anymore) could be submitted, and only for the valid data exchange contexts the fetch operation is carried out for resuming the data exchange session.

According to a preferred embodiment it is proposed that the user equipment further maintains a context identity provided by the selected core network, wherein the connection reestablishment message comprising a core network context fetch instruction providing said context identity and said first device identity.

The context identity is identifying said data exchange context. Together with the first device identity, in particular the TMSI or RNTI provided by the first core network, the parameter for the depicted data exchange context should be easily determined within the first core network.

Preferably it comprises or is enhanced by a core network identity, that depicts which core network identity handles this context.

The core network context fetch instruction preferably also provides information related to the core network or more specific to the core network element of said core network that has issued or keeps said identified context.

With this embodiment it is simplified for the addressed core network element to identify the core node element. Whereby this does not necessary mean that the addressed core network element would need to directly access the identified core network element, but simplified the routing. This is in particular helpful when the context identity is not unique within the first core network.

In response to the connection reestablishment message the user equipment receives from the second base node a message comprising at least a second device identity. This second device identity was created during creation of new data exchange context within the second core network.

Consequently the user equipment sends an acknowledgement message, which confirms reception of the previous message and indicates that the data exchange session can be resumed. This acknowledgment message in particular comprises the new second device identity for confirmation.

Then the data exchange session is resumed with the second base node over the second core network by using the second device identity. In the cellular network all necessary steps are then taken. Preferably also the context identity of the second data exchange context is provided to the user equipment, preferably to be used for the next connection reestablish message.

This inventive method is advantageous as it relieves the user equipment from all steps that need to be taken between the core networks. Further there is only a low delay compared to the case of a base node supporting access to the initially selected core network.

The big advantage is that the data exchange session can be continued, instead of the need to set it up anew. This could be rejected by the communication endpoint. Hence the inventive method simplifies handling for the user equipment, makes the connection more reliable and in the end leads to less signalling for the cellular network and less power consumption at the user equipment.

In another preferred embodiment it is proposed that the user equipment maintains at least one first encryption key received from the first base node, whereby the step of receiving the second device identity is conducted using said at least one first encryption key, further comprising the step of receiving criteria for generating at least one second encryption key from the second base node, whereby the step of resuming the data exchange session is conducted using said at least one second encryption key.

With this embodiment the important issue of securing the communication is addressed. This shows that the suggested method is applicable in today's cellular network, which needs to be secured from being hacked, intercepted or surveilled.

The known cellular networks secure there communication be negotiating one or more encryption keys for each data exchange session with a user equipment. However, these encryption keys are tied to the core network.

Consequently when setting up a data exchange context, at least one first encryption key is received at the user equipment, and maintained, that is: stored, and used for the messages for this data exchange context.

However the key generation may vary between the first and the second core network, and therefore the encryption key of the first core network is not usable for serving a user equipment in the second core network. Hence for the shown method steps it needs to be assured that a new set of encryption keys is created and securely exchanged.

For this it is suggested that the message received at the user equipment with the new second device identity is in particular encrypted using the at least one first encryption key.

However, together with this message, or in a separate message, the user equipment further receives criteria for generating at least one second encryption key for securing the communication with the second base node and the second core network.

Such criteria encompass in a simple embodiment to provide a second encryption key.

Alternative this method step comprises provision of key components, random number and/or an authentication token which together with a shared secret, e.g. a master key (in particular stored in the USIM card connected with the user equipment and a central register of the core network) allow the user equipment to generate a new key. Typically this provides, that the user equipment sends back a key derived from the second encryption key to the base node, until both sides have available the second encryption key. This method is known and called Authentication and Key Agreement (AKA) and helps user equipment and core network to establish symmetric keys for encrypting the exchanged data.

Consequently when this negotiation of the second encryption key is carried out, the following messages are encrypted using the second encryption key. This in particular relates to the messages as part of the step of resuming the data exchange session. It is possible to first negotiate encryption keys and then carry out the connection reestablishment procedure or vice versa. Both orders are encompassed by this invention.

Additionally this also affects in particular the acknowledgement message to the base node.

It is shown that the suggested method for selection of a base node and another core network is also operable with established security measures, without creating too much overhead on both sides, the user equipment and the core network.

According to the second aspect of the invention it is proposed user equipment for operating on a first base node of a cellular network, the first base node being communicatively coupled to two core networks of said cellular network, the user equipment being configured to operate in a data exchange session by means of a data exchange context terminating in selected one of the two core networks, and to maintain a first device identity received from said selected core network, wherein the user equipment is configured to:
  identify at least one second base node of said cellular network,
  check if said at least one second base node has access to the selected core network,
  if not, send a connection reestablishment message to the second base node, having access to a core network different from the selected core network, hereinafter the second core network,
  receive through the second base node a second device identity of the second core network,
  send an acknowledge message to the second base node,
  resume said data exchange session with said second base node over the second core network using said second device identity.

The user equipment according to this aspect of the invention is in particular equipped with transmitting and reception circuitry, in particular a transceiver. Further it comprises processing circuitry for executing control software for controlling the transmitting and reception circuitry. Preferably the user equipment comprises a memory, permanent and/or volatile. The user equipment is further preferably connected with a subscriber identity card, in particular a USIM or (e)UICC, either removable or soldered.

The user equipment is operating with at least one base node of the sixth aspect of the invention.

The second aspect of the invention shares the advantages of the first aspect of the invention.

According to a third aspect of the invention it is suggested a first core network element of a first core network being part of a cellular network comprising at least two core networks, said first core network element being communicatively coupled to at least one second core network element (SCNE) of a second core network being part of the cellular network, wherein the first core network element is configured to:
  receive a core context fetch message comprising a device identity and a context identity from one of the second core network elements,
  fetch a first data exchange context based on said context identity, said first data exchange context comprising a set of parameter concerning the first data exchange context,
  providing to said second core network element a context message comprising at least parts of said set of parameter concerning said first data exchange context.

This aspect of the invention relates to a first core network element of a cellular network, wherein the cellular network has at least two core networks. Each core network comprises a couple of core network elements, wherein the first core network element is part of the first core network. The second core network element according to the fourth aspect of the invention is consequently part of the second core network.

The first core network element is communicatively coupled to at least one second core network element. This is regardless if this coupling is direct or indirect via an intermediate or another first core network element.

The first core network element comprises communication circuitry for communicating with at least one base node, with other first core network elements, and/or for communicating with said at least one second core network element.

Further it provides preferably processing circuitry, volatile and permanent memory.

The user equipment of the first aspect of the invention requested a data exchange session by means of a data exchange context, which is operated through the first core network. The user equipment is served by said first base node.

Possibly before leaving the cell area of the first base node, the first core network element handled the first data exchange context for this user equipment.

Depending upon the duration of the first data exchange context and the spatial behavior of the user equipment the first core network element may have created the first data exchange context. This includes providing a first device identity for the requesting user equipment. Preferably it includes providing a context identifier to the user equipment.

Potentially the first core network element was never involved in the data exchange context, but has means to carry out the steps as depicted in this aspect of the invention.

According to this aspect, the first core network element is configured to receive a core context fetch message comprising a device identity from one of the second core network elements. This is in particular happening after the user equipment left the cell area of the first base node and sent a connection reestablishment message to the second base node, which is not directly communicatively coupled to the first core network element.

With the device identity provided with the core context fetch message the first core network element is able to retrieve from the accessible set of open first data exchange contexts the one that applies to the user equipment identified by the device identity. Such set of first data exchange contexts is preferably available to all first core network elements of the first core network, as in this case it is not important that the second core network element addresses the correct first core network element.

Preferably the core context fetch message further comprises the context identity that was provided to the user equipment when setting up the data exchange context, resp. resuming a data exchange context. With that the respective parameter concerning the first data exchange context are easily located and retrieved.

Preferably the core context fetch message further comprises a core node identity of the first core network element which served the user equipment before it left the cell area of the first base node. In this case the first core network element which received the core context fetch message has the possibility to access the first core network element identified with the core node identity in order to let it support for or handle the following steps.

Such first data exchange context comprises a set of parameter concerning the first data exchange context. Such parameter may comprise the device identity, and indication of the communication end point, e.g. an IP address or another user equipment in this or another (cellular) network, encryption keys, connection and/or service type information.

If none first data exchange context is found this is reported to the requesting second core network element.

Otherwise the first core network element responds to the requesting second core network element with a context message comprising at least parts of said set of parameter concerning said first data exchange context. Such set of parameter is at least comprising those data that are needed to recreate a second data exchange context.

The described process may also be initiated by another first core network element, for continuing the first data exchange context.

In another preferred embodiment it is proposed to receive a message from said second core network element indicating acknowledgment of creating a second data exchange context replacing said first data exchange context, in response to conduct at least one of closing and deleting said first data exchange context.

This embodiment relates in particular to the phase, when the second data exchange context has been created by the second core network element. After the user equipment acknowledges reception of the second device identity and related data, in particular encryption key creation criteria, then preferably the first core network element receives another request from the second core network element, indicating said acknowledgement.

In this case the first core network element is informed, that the first data exchange context is not needed anymore. Hence it takes the necessary steps to close and/or delete the first data exchange context. This may comprise to in-form other components of the first core network, and/or the cellular network as such.

This embodiment assures that no 'zombie' data exchange contexts are maintained and fill up the databases and slow down further communication. Additionally or alternatively a timer is running which deletes a data exchange context when for a given time no operation involving said data exchange context was carried out, like data transmission or the like.

According to the fourth aspect of the invention it is proposed a second core network element of a second core network being part of a cellular network comprising at least two core networks, the second core network element being communicatively coupled to at least one first core network element of a first core network being part of the cellular network, said second core network element further being communicatively coupled to at least one base node, wherein the second core network element is configured to:
  receive from said base node a core context request message comprising a first device identity identifying a user equipment which operates with said base node, and at least one context identity,
  send a core context fetch message to said first core network element,
  determine that said first device identity and said context identity is used in a data exchange session of the first core network element,
  receive from said first core network element a context message comprising context parameter of an first data exchange context of said user equipment,
  generate a new device identity for said user equipment,
  create a second data exchange context using said received context parameter, and
  provide to the base node a set of context parameter relating to said second data exchange context and said second device identity.

The second core network element is—alike the first core network element—a core network element of the cellular network, wherein the second core network element is part of the second core network. It is communicatively coupled to base nodes supporting the technology standard of said second core network. It is further communicatively coupled to at least one first core network element, according to the third aspect of the invention. It is preferably further communicatively coupled to other second core network elements of said first core network element.

Via the communicative coupling the second core network element is configured to receive a core context request message from the second base node. This is in particular happening after the user equipment of the first aspect of the invention left the cell area of the first base node and identified the second base node.

Preferably it was already figured out, that the second base node cannot access the first core network, but the second core network. Alternatively the core context request message is a way to figure that out.

If this is the case, it requires ways to reconstruct the first data exchange context for resuming the data exchange session after the cell change from the first base node to the second base node. This process is called fetching the data exchange context.

Preferably the core context request message is a message type that is already defined, but in this case—when a fetching of a data exchange context is supposed to be carried out—populated with an additional information element indicating the envisaged procedure of fetching the first data exchange context. Hence the second core network element receives the core context request message from the base node.

The core context message comprises a first device identity. Preferably it also comprises at least one context identity. With that the second core network element can determine, if the user equipment identified with that first device identity is handled in an data exchange context handled by the second core network. If this is not the case this result may be provided to the base node. In that case the user equipment was most likely operating in another core network, in particular the first core network.

On request or initiatively the second core network element is configured to acquire the information for the currently open first data exchange context characterized by the related context identity from the respective first core network element. For doing so the second core network element is configured to send a core context fetch message to a first core network element.

Preferably said context request message further comprises a core node identity identifying a first core network element, wherein said sending the core context fetch message is addressed to said first core network element by means of said core node identity.

With this embodiment the retrieved core node identity is used for addressing the first core network element. This might comprise that the first core network element is directly addressed through the core node identity. Alternatively the second core network element has access to one or more first core network elements, and sends the core context fetch message to one of them, with the core node identity in order to facilitate retrieving said first data exchange context through said addressed first core network element.

In any case, the second core network element is expecting to retrieve in response a set of parameter concerning the depicted first data exchange context from the first core network element.

Additionally it is preferably configured to receive from the first base node a set of capability information relating to said user equipment.

With that set of parameter and potentially additionally available information, in particular the capabilities, the second core network element in particular creates a second data exchange context. This happens in conjunction of creating a new second device identity. Preferably first the new second device identity is created, and then used to create the second data exchange context. Alternatively both steps are carried out together, or in another order.

When the second data exchange context is created and the second device identity is available, the requesting base node is informed about this outcome. This comprises that a set of context parameter relating to said second data exchange context and the new second device identity is provided to the requesting base node. The context parameter in particular also comprise a context identity of the second data exchange context.

The second core network element as described is the key element in solving the addressed problem. It is configured to take the request from the user equipment—through the base node—and to gather the necessary parameter from the first core network in order to recreate the second data exchange context from the parameter of the first data exchange context.

This relieves the user equipment from making additional steps in order to resume the data exchange session. Further it simplifies migration of the cellular network to supporting the first core network (which is typically introduced later), in a coexistence for access from the base nodes of the first base node, that have access to more than one core networks of different technology standard.

In another preferred embodiment it is proposed that the second core network element is further configured to create criteria for generating at least one second encryption key, wherein the second core network element is configured in conjunction with said providing to the base node of the set of context parameter to provide said criteria to the base node.

With this embodiment the handling of encryption keys is covered by involving the second core network element. For doing so the second core network element is configured to create and provide criteria for generating at least one second encryption key for securing the communication within the second data exchange context.

As indicated for the method for the user equipment according to the first aspect of the invention, this set of criteria preferably comprises a random number and/or an authentication token, and/or a shared secret, e.g. a master key, which allows the user equipment to create the second encryption key, and carry out further exchanges until both the user equipment and the second core network element are equipped with the at least one second encryption key. This procedure is following the known AKA procedure.

In a simple embodiment the second core network element creates the at least one second encryption key and provides it to the base node, and finally to the user equipment.

Obviously this helps securing the communication also for resuming the data exchange session over the second data exchange context. To continue using the first encryption key is not useful, as it requires control of key, which needs to involve the first core network.

However, this does not rule out another preferable embodiment, wherein the core context request message further comprises at least one first encryption key, wherein the message for providing the set of context parameter is encrypted by means of said at least one first encryption key.

With this embodiment the second core network element retrieves the first encryption key with the core context request message. This is preferably used to encrypt the message with the context parameter, by using said first encryption key.

Alternatively, but more time consuming for the second core network element, it is also encompassed to first negotiate the second encryption key with the user equipment, and then provide the context information encrypted with the second encryption key to the UE. Then the second core network element would not need to work with the first encryption key—e.g. if a different encryption method is defined.

With that embodiment the retrieval of a new second data exchange context is secured from the beginning.

After that the resumed data exchange session is carried out by using the second encryption key for securing the data exchange session via the second data exchange context.

In another preferred embodiment it is proposed to receive an acknowledgement message from the base node comprising the second device identity, in response indicate said acknowledgment to the first core network element for conducting at least one of closing and deleting the context.

This embodiment is for finalizing the phase of recreation of the second date exchange context from the first data exchange context, at the second core network element.

For that the second core network element is configured to receive an indication that the user equipment acknowledged the reception of the parameter for the second data exchange context (and potentially the second encryption key as well), by means of sending the second device identity.

For allowing to clean up the held data exchange contexts in the first core network, the second core network element sends an indication to at least one first core network element. With that the first core network can close and delete the first data exchange context. As the new second data exchange context is up and running, the first data exchange context is not needed anymore.

This aspect of the invention shows the advantages of the proposed solution for the addressed problem. Only a few components are involved and they do what they are supposed to do: communicate with other components, create a data exchange context, create criteria for key generation etc.

Should the data exchange session use a service of the first core network element, e.g. of a dedicated 5G slice, then it needs to be decided how to continue. First it needs to be checked if the used service is available for the second core network.

If not there is—depending upon the type of service—the possibility to provide that type of service in the second core network that comes close to the used service. Otherwise the data exchange session is aborted, in this case preferably with an abnormal condition abort. The first option requires intelligence of the involved first and/or second core network elements. Alternatively or additionally further message flow with the base node and/or the user equipment is necessary in order to figure out, if there are ways to continue the data exchange session or to abort in that situation.

In a fifth aspect of the invention it is proposed a method for operating a second core network element of a cellular network, communicatively coupled to at least one first core network element of the cellular network, said second core network element further being communicatively coupled to at least one base node, the method comprising the steps for the second core network element of:

receiving from said base node a core context request message comprising a first device identity identifying a user equipment which operates with said base node,
determining that said first device identity is operated in a data exchange session by means of a first data exchange context of the first core network element,
if this is the case, send a core context fetch message to said first core network element,
receiving from said first core network element a context message comprising context parameter of an first data exchange context of said user equipment,
generating a new device identity for said user equipment,
creating a second data exchange context using said received context parameter, and
providing to the base node a set of context parameter relating to said second data exchange context and said second device identity.

The fifth aspect of the invention shares the advantages of the fourth aspect of the invention.

According to the sixth aspect of the invention it is proposed a base node of a cellular network communicatively coupled to at least one second core network element of a core network of said cellular network, and configured to serve a plurality of user equipments, wherein the base node is configured to:

receive a connection reestablishment message from one of the served user equipment, wherein the connection reestablishment message comprising an indication of a second core network element belonging to a different core network, than the base node is connected to, and a device identity and at least one context identity of said user equipment,
sending a core context request message to the second core network element comprising the device identity and the at least one context identity,
receiving in response a set of context parameter relating to a second data exchange context and a new device identity,
forwarding new device identity to said served user equipment.

This aspect relates to a base node of a cellular network which is communicatively coupled to a second core network element according to the fourth aspect of the invention. This base node is in particular not capable to directly communicate with a first core network element according to the third aspect of the invention.

When a user equipment according to the second aspect of the invention decides to camp on this base node after it was operating in an open data exchange session with a base node that could operate with a first core network element, it is supposed to send a connection reestablishment message to this base node. This comprises a device identity which identified the user equipment in the first data exchange context, of the first core network.

It further comprises an indication relating to that the user equipment was operating with a core network element belonging to a different core network than the one the base node is connect to. This is in particular happening after the user equipment sent a first connection reestablishment message, but received a response that the data exchange context is not available in the second core network, where the base node is communicatively coupled with (in particular only).

In response to receiving this message the base node is configured to send a core context request message to the second core network element, which the base node is communicatively coupled with. This core context message at least comprises the device identity, and preferably a context identity. With this message it is intended to fetch the first data exchange context.

It shall instruct the second core network element to retrieve the parameter of the first data exchange context from the first core network and create a new second data exchange context.

Consequently then the base node retrieves a set of context parameter relating to the then created second data exchange context. This in particular comprises a new device identity.

Said information are forwarded to the requesting user equipment.

Preferably also parameter for creating a second encryption key are retrieved from the second core network element and forwarded to the user equipment. According to another preferred embodiment the base node is further configured to provide in response to reception of an acknowledgment message from said service user equipment an acknowledgment message comprising said new device identity to the second core network element.

This step finalizes for the base node the data exchange context recreating phase by receiving and forwarding an acknowledgment message with the new device identity.

After that the base node is then used by the user equipment to resume the data exchange session via the new second data exchange context, terminating in the second core network element.

As it is shown this invention advantageously solves the depicted problem and proposes a message flow between the involved elements which seamlessly integrate in the existing structure and allow with low impact for all involved entities to continue the data exchange session with another core network of the cellular network.

BRIEF DESCRIPTION OF THE DRAWINGS

The following description and the annexed drawings set forth in detail certain illustrative aspects and are indicative of a few of the various ways in which the principles of the embodiments may be employed. Characteristics and advantages of the present invention will appear when reading the following description and annexed drawings of advantageous embodiments given as illustrative but not restrictive examples.

Figure 1:
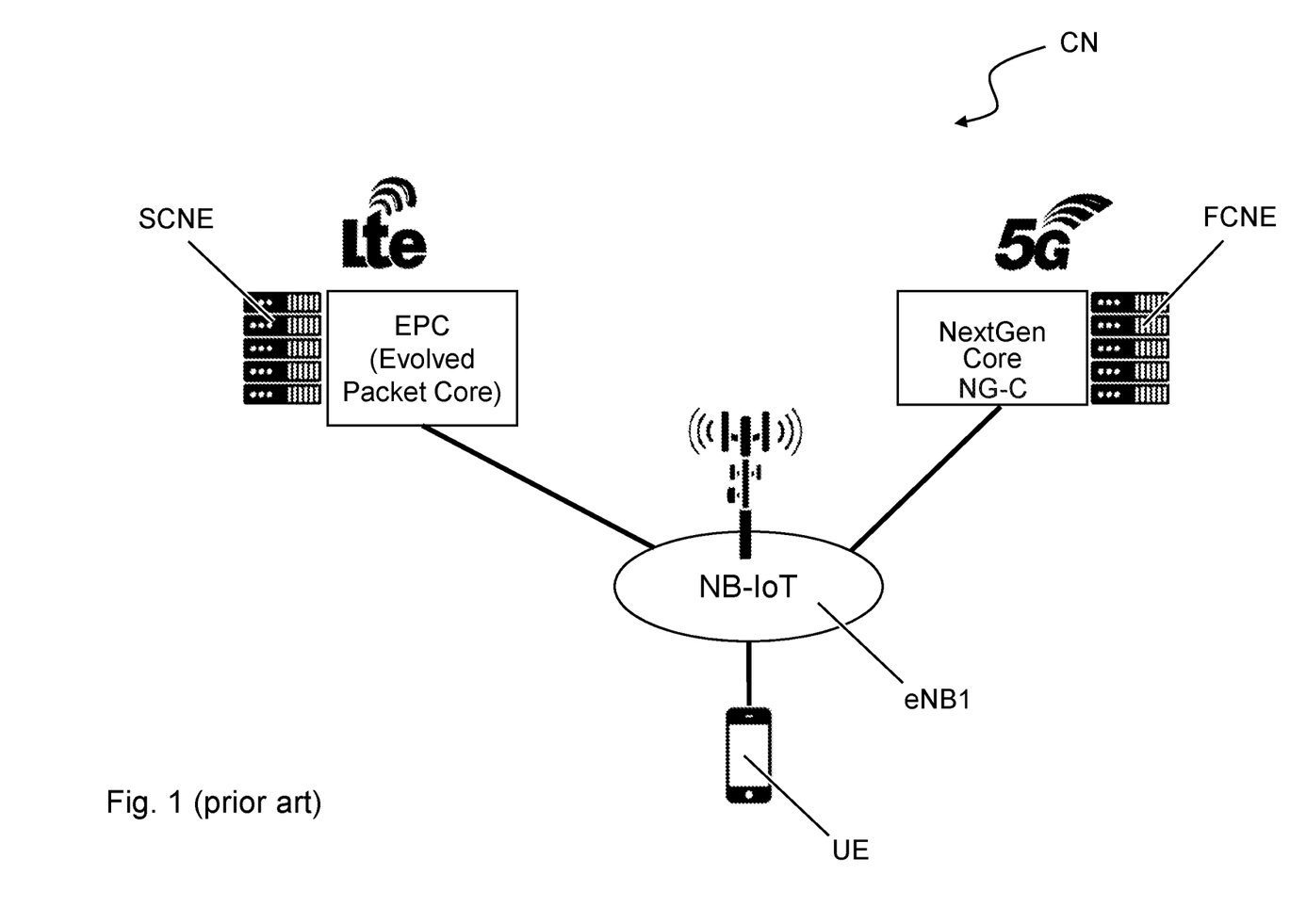
FIG. 1 represents a user equipment of the type to which the present invention is applied to as an embodiment in conjunction with a base node according to the prior art.

FIG. 1 schematically shows a user equipment UE according to the prior art. The user equipment UE is camping on a base node eNB1 supporting the NB-IoT category. The base node eNB according to this embodiment might therefore be a 4G or a 5G base node, as NB-IoT is for both technology standards defined, at least backwards compatible.

The base node eNB1 is connected to core network elements of at least two core networks, in this case the first core network element FCNE, which supports 5G (New Radio) and the second core network element SCNE, supporting 4G (LTE). The core networks of the respective technology standards are called for 4G Evolved Packet Core (EPC) and for 5G NextGen-Core (NGC).

Each core network provides different capabilities. E.g. the 5G core network NGC might have the capability of supporting certain slices, e.g. for ultra-reliable communication or dedicated for machine-type communication.

For a user equipment UE leaving the coverage area of the base node eNB1, it has to care for mobility when operating in an open data exchange session. For this situation the prior art offers no solution.

Figure 2:
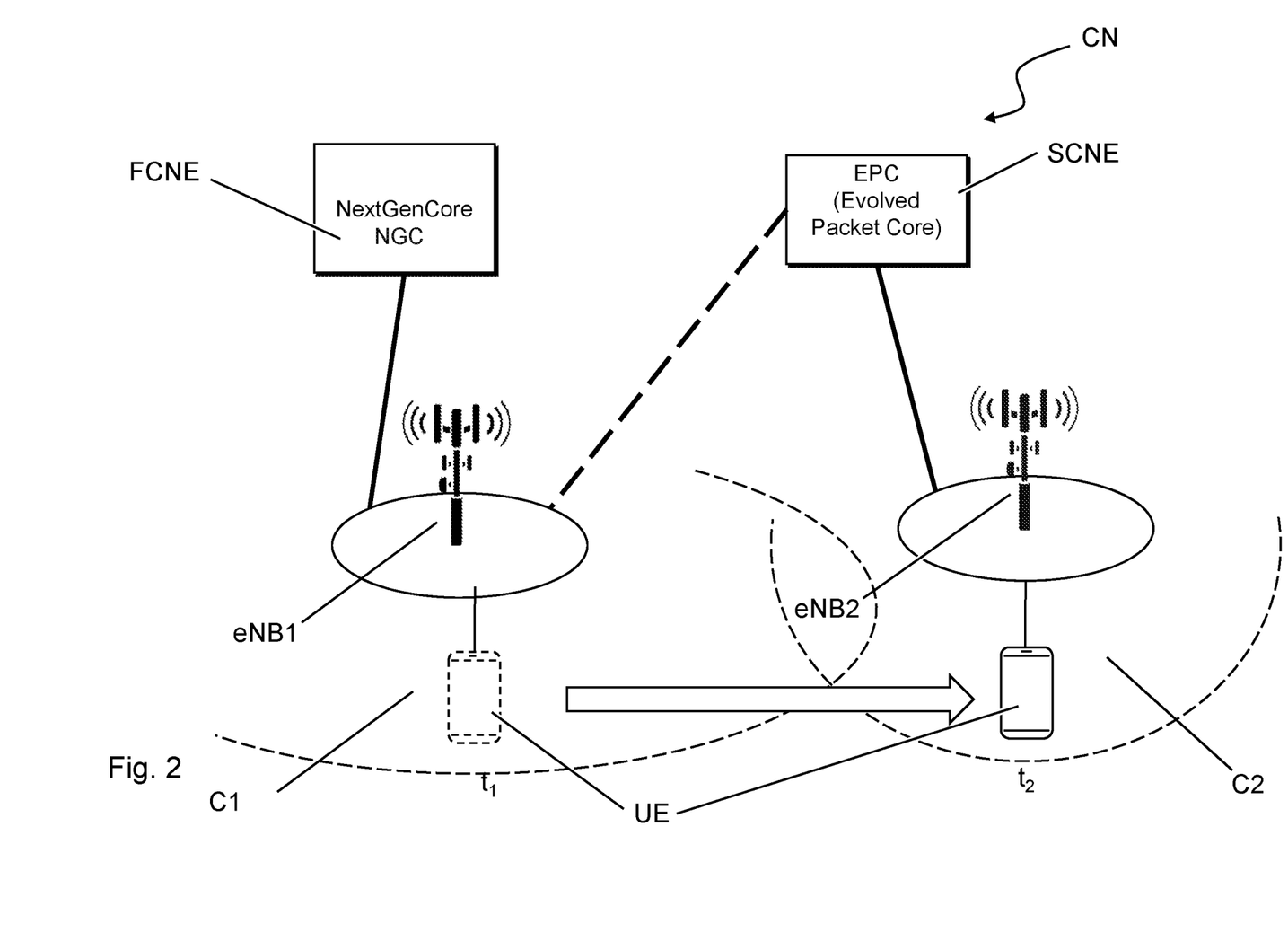
FIG. 2 represents in an exemplifying embodiment a user equipment operating non-stationary with two base nodes.

For doing so the inventive method is illustrated by an exemplifying embodiment in FIG. 2.

The user equipment UE as shown in FIG. 2 is operating non-stationary, that means it is moving. It is situated in cell C1 of the first base node eNB1. In the shown example after camping on the first base node eNB1 it is setting up a connection at time $t_1$ with the selection of one of the core networks. The connection is in this case set up by means of the first core network element FCNE, which is indicated by a solid line as opposed to the dashed line to the second core network element SCNE of the EPC.

Then at time $t_2$ the user equipment UE moved away from the base node eNB1, that means out of cell C1 into cell C2 of the second base node eNB2

It turned out that the signals from base node eNB1 are received that bad, that radio link failures (RLF) appear. This indicates to a user equipment UE operating in NB-IoT, that it cannot continue operating with said currently serving base node.

Hence the user equipment UE selects a better suitable base node, in this case the second base node eNB2.

However the base node eNB2 does not have access to both core networks, only to the EPC, represented by the second core network element SCNE. In this situation the situation appears, that the base node eNB2 has no means to retrieve the data exchange context that was setup for creating the data exchange session at time $t_1$.

Figure 3:
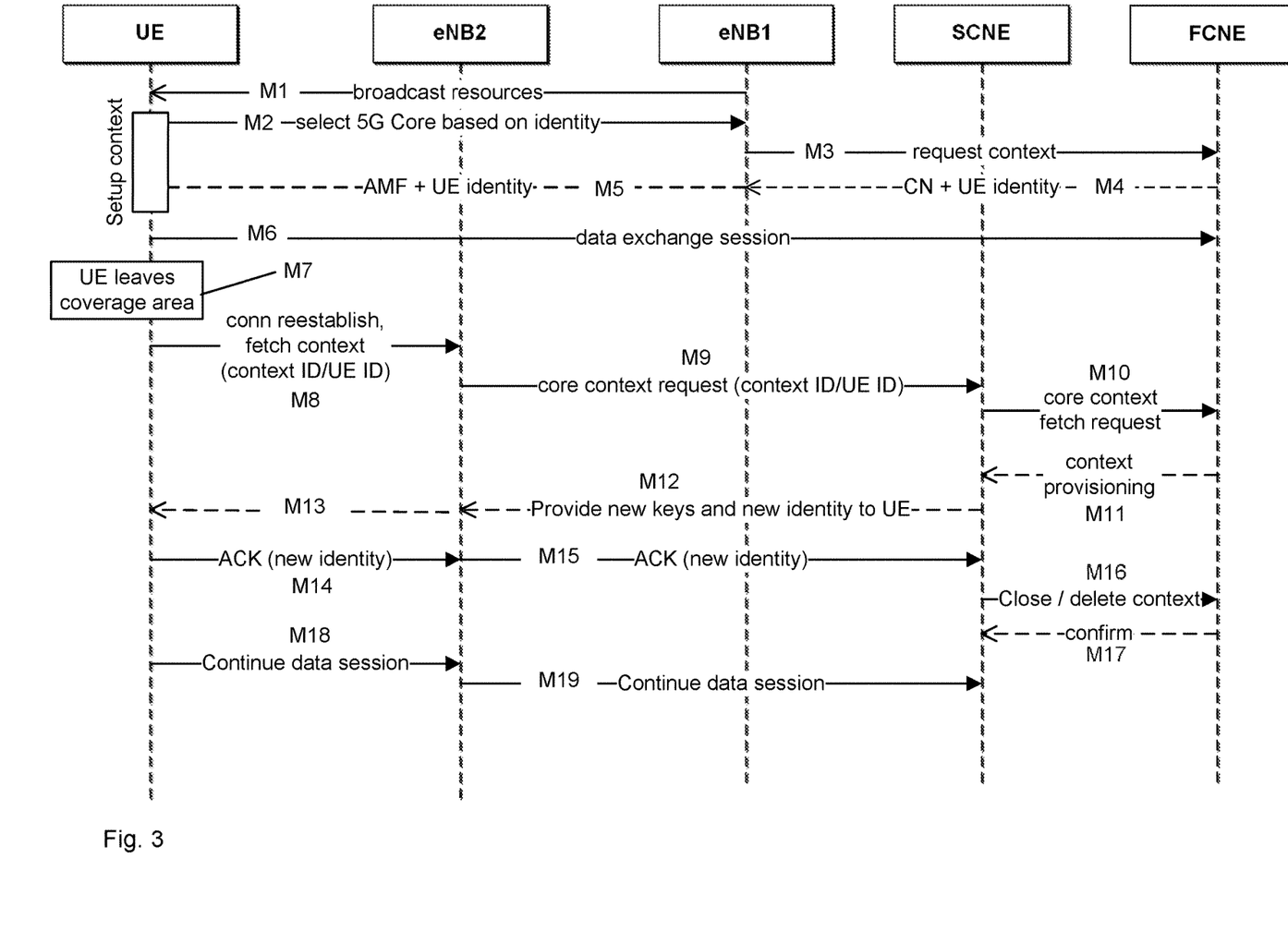
FIG. 3 shows a sequence diagram of a preferred embodiment of the inventive method.

To solve that issue the message flow of FIG. 3 according to an exemplifying embodiment of the invention is preferably executed.

This process flow starts with a user equipment UE which is situated in the cell area C1 of a first base node eNB1. This base node has access to a first core network element FCNE and a second core network element SCNE of a first and a second core network, in particular a 5G NextGenCore (NGC) and a 4G Evolved Packet Core (EPC).

The first base node eNB1 broadcasts with message M1 information relating to resources for both core networks. In response for camping on the base node eNB1 and setting up a data exchange session, the user equipment UE selects the 5G NextGenCore by picking the respective resources with message M2.

The first base node eNB1 takes this request, forwards it to the first core network element FCNE of the 5G NGC with a request for a context ID. This includes setting up a context with message M3.

In response the first core network element provides when successful with message M4 to the first base node the data exchange context parameter, in particular the device identity. More information are preferably provided, in particular the core network identity and/or the context identity identifying the established first data exchange context. The received data, are at least parts thereof, are forwarded with message M5 to the user equipment.

Hence now the data exchange session over the first data exchange context is setup up and running, as indicated by message M6, which is a data exchange message that is supposed to terminate at the FCNE. This may comprise sending measurement data from a metering device.

At step M7 the UE leaves the coverage area of the first base node eNB1 in that way, that the signals of the first base node are that bad, that the user equipment evaluates if at least one second base node eNB2 is according to the suitability criteria better suited for communication. This is in particular happening through a plurality of radio link failures. If this is the case, the user equipment decides to reselect to the second base node eNB2.

Now the user equipment has the need to continue the running data exchange session. By now the user equipment UE does not necessarily know if the second base node eNB2 has access to a first core network element FCNE, which could easily retrieve the data exchange context and simply continue operating the data exchange session with it.

Alternatively the user equipment retrieves e.g. through a broadcast or any other kind of data exchange, in particular during the re-selection phase, the information from the second base node eNB2, that it is only able to access a second core network element SCNE being part of the LTE core network.

In any case the user equipment sends a connection re-establish message M8 to the second base node. This message in particular comprises the retrieved device identity and in this exemplifying embodiment at least one related context identity. Preferably it also comprises an identifier of the first core network element, here called core node identity, which it in particular retrieved through message M5 above.

The second base node eNB2 sends this request with message M9 to the accessible second core network element SCNE. There it is preferably figured out, in particular by means of the core node identity, that the user equipment was by now served by a core node element of another core network.

Consequently it uses the core node identity to send a core context fetch message M10 to another first core node element of the core network, that is handling the identified data exchange context, in order to retrieve the data exchange context parameter. This does not necessarily mean that the first core network element FCNE, which is identified by the core node identity, is directly accessed. It is rather possible that any of the first core network elements of the 5G core network receives a message, wherein the first core network element which was handling the data exchange context is identified through the core node identity. The addressed first core network element FCNE will than handle within its core network all necessary steps to retrieve the data exchange context information.

These are provided to the second core network element SCNE with message M11. The second core network element SCNE creates a new data exchange context with these received information and creates a new second device identity. These information and the second device identity and the context identity of the new second data exchange context are provided with message M12 to the second base node eNB2 and with message M13 to the user equipment. These messages are in particular encrypted with a first encryption key that was negotiated between the user equipment and the first core network element. Preferably this message also comprises criteria for generating a new set of encryption keys for the coming communication. This is necessary as the originally used keys from the first core network element FCNE cannot be reused by the second core network element.

It is likely that this key generation requires some more messaging between the user equipment and the second core network element, until both have securely retrieved the encryption key.

The user equipment then sends with message M14 an acknowledgment message to base node eNB2, which then forwards this message with message M15 to the second core network element SCNE. This acknowledgment in particular comprises the new second device identity.

When the second core network element SCNE receives this acknowledgment it is sure that the second data exchange context was well established. Hence it can instruct with message M16 to close and/or delete the first data exchange context at the first core network element FCNE. Again it may be another component of the 5G core network which actually does the work, but the addressed first core network element confirms with message M17 the deletion etc.

This information is not important for the user equipment as it may assume with the acknowledgment that it can now resume the data exchange session. This is done with message M18 to the base node eNB2, respectively message M19 to the second core network element. This message is in particular encrypted with the created encryption key from message M13.

Also the acknowledgement message M14 may be encrypted with this key. As this has no big data which need to be secured, this is not mandatory.

Now the user equipment can continue with the data exchange session on basis of the new created second data exchange context via the second core network element SCNE.

In case that the data exchange session comprises service parameters that are not supported by the second network, e.g. 5G services like ultra-low latency operation, then there are two options.

First the related parameters will be replaced by appropriate default values. Preferably it is indicated in a message to the user equipment, that this replacement has happened. So the user equipment may decide not to continue the data exchange session under that conditions, or to accept this replacement.

Second the data exchange context is indicated as not being able to be resumed as such, i.e. the context request message sent by the device is rejected and hence a new session is set up (abnormal condition abort).

With the shown message flow it is achieved, that in a manner with low impact for the user equipment the established data exchange session can be continued although it changed to a base node which has no access to the originally used core network.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for a user equipment (UE) operating on a first base node (eNB1) of a cellular network (CN), the first base node communicatively coupled to two core networks of said cellular network, the user equipment (UE) operating in an open data exchange session by means of a data exchange context terminating in selected one of the two core networks, the user equipment further maintaining a first device identity received from said selected core network, the method comprising the step for the user equipment of:
   identifying at least one second base node (eNB2) of said cellular network (CN),
   checking if said at least one second base node (eNB2) has access to the selected core network,
   if not, sending a connection reestablishment message to the second base node (eNB2), having access to a core network different from the selected core network, hereinafter the second core network,
   receiving through the second base node a second device identity of the second core network,
   sending an acknowledge message to the second base node (eNB2), and
   resuming said data exchange session with said second base node (eNB2) over the second core network using said second device identity,
   wherein the user equipment (UE) further maintains a context identity provided by the selected core network, and
   wherein the connection reestablishment message comprising a core network context fetch instruction providing said context identity and said first device identity.

2. The method according to claim 1,
   wherein the step of identifying at least one second base node (eNB2) is conducted in response to detecting a radio link failure in communication with the first base node (eNB1).

3. A method for a user equipment (UE) operating on a first base node (eNB1) of a cellular network (CN), the first base node communicatively coupled to two core networks of said cellular network, the user equipment (UE) operating in an open data exchange session by means of a data exchange context terminating in selected one of the two core networks, the user equipment further maintaining a first device identity received from said selected core network, the method comprising the step for the user equipment of:
   identifying at least one second base node (eNB2) of said cellular network (CN),
   checking if said at least one second base node (eNB2) has access to the selected core network,
   if not, sending a connection reestablishment message to the second base node (eNB2), having access to a core network different from the selected core network, hereinafter the second core network,
   receiving through the second base node a second device identity of the second core network,
   sending an acknowledge message to the second base node (eNB2), and
   resuming said data exchange session with said second base node (eNB2) over the second core network using said second device identity, wherein the user equipment (UE) maintains at least one first encryption key received from the first base node (eNB1),
whereby the step of receiving the second device identity is conducted using said at least one first encryption key,
further comprising the step of receiving criteria for generating at least one second encryption key from the second base node (eNB2),
whereby the step of resuming the data exchange session is conducted using said at least one second encryption key.

4. A User equipment (UE) for operating on a first base node (eNB1) of a cellular network (CN), the first base node being communicatively coupled to two core networks of said cellular network (CN), the user equipment (UE) being configured to operate in a data exchange session by means of a data exchange context terminating in selected one of the two core networks, and to maintain a first device identity received from said selected core network, wherein the user equipment UE) is configured to:
identify at least one second base node (eNB2) of said cellular network (CN),
check if said at least one second base node (eNB2) has access to the selected core network,
if not, send a connection reestablishment message to the second base node, having access to a core network different from the selected core network, hereinafter the second core network,
receive through the second base node (eNB2) a second device identity of the second core network,
send an acknowledge message to the second base node (eNB2), and
resume said data exchange session with said second base node (eNB2) over the second core network using said second device identity,
wherein the user equipment is further configured to maintain a core node identity provided by the selected core network, and
wherein the connection reestablishment message comprising a core network context fetch instruction providing said core node identity and said first device identity.

5. A User equipment (UE) for operating on a first base node (eNB1) of a cellular network (CN), the first base node being communicatively coupled to two core networks of said cellular network (CN), the user equipment (UE) being configured to operate in a data exchange session by means of a data exchange context terminating in selected one of the two core networks, and to maintain a first device identity received from said selected core network, wherein the user equipment UE) is configured to:
identify at least one second base node (eNB2) of said cellular network (CN),
check if said at least one second base node (eNB2) has access to the selected core network,
if not, send a connection reestablishment message to the second base node, having access to a core network different from the selected core network, hereinafter the second core network,
receive through the second base node (eNB2) a second device identity of the second core network,
send an acknowledge message to the second base node (eNB2), and
resume said data exchange session with said second base node (eNB2) over the second core network using said second device identity,
wherein the user equipment is further configured to maintain at least one first encryption key received from the first base node (eNB1),
whereby for receiving the second device identity the user equipment (UE) is configured to use said at least one first encryption key,
further to receive criteria for generating at least one second encryption key from the second base node (eNB2),
whereby for resuming the data exchange session the user equipment is configured to use said at least one second encryption key.

* * * * *